United States Patent [19]
King

[11] 3,790,793
[45] Feb. 5, 1974

[54] MOLECULAR SCANNER
[75] Inventor: John G. King, Brookline, Mass.
[73] Assignee: Massachusetts Institute of Technology, Cambridge, Mass.
[22] Filed: Nov. 5, 1971
[21] Appl. No.: 196,236

Related U.S. Application Data
[63] Continuation of Ser. No. 56,056, June 25, 1970, abandoned, which is a continuation of Ser. No. 713,969, March 18, 1968, abandoned.

[52] U.S. Cl................. 250/251, 250/306, 250/307, 250/389, 250/423, 250/493
[51] Int. Cl.......................... G01n 27/78, H01s 1/00
[58] Field of Search. 250/41.3, 41.9 SE, 42, 49.5 R, 250/49.5 E, 49.5 P, 84

[56] References Cited
UNITED STATES PATENTS
3,180,987   4/1965   Cunningham et al............. 250/49.5
3,415,985   12/1968  Castaing et al.................... 250/49.5

OTHER PUBLICATIONS
"Abbildung Von Verdampfungsquellen Mit Dem Lochkamerauerfahren" by H. Boersch et al. from Zeitschrift Fur Physik, Vol. 139, No. 3, 1954, pgs. 243–250.

"Some New Applications and Techniques of Molecular Beams" by J. G. King et al. from Advances in Electronics and Electron Physics, Vol. 8, 1956, pgs. 42–51.

"Strong Ion Source For Ions From Solids" by E. F. Krimmel from The Review of Scientific Instruments, Vol. 37, No. 5, May, 1966, pgs. 678 & 679.

Primary Examiner—William F. Lindquist
Attorney, Agent, or Firm—Arthur A. Smith, Jr.; Martin M. Santa; John N. Williams

[57] ABSTRACT

A device and method in which neutral atoms or molecules are used to observe surfaces of samples and capable in particular of producing information from inhomogeneous samples where the forces and interactions are of strength characterized by moderate temperatures in the range of 100°K to 500°K. Molecules evaporating from the surface of a sample are shown selected by a pin-hole and detected and converted to an ion current by a surface ionizing detector. With relative scanning movement of components of the system, the ion current is monitored and recorded, indicating the spatial variation in evaporation of the molecules from the sample.

19 Claims, 5 Drawing Figures (a)

(b)

(c)

INVENTOR
J.G. KING
BY
ATTORNEY

MOLECULAR SCANNER

This application is a continuation of my co-pending application Ser. No. 56,056 filed June 25, 1970, now abandoned, which in turn is a continuation of my co-pending application Ser. No. 713,969, filed Mar. 18, 1968, now abandoned.

The invention herein described was made in the course of a contract sponsored by the United States Army Electronics Command.

This invention relates to scanning devices and in particular to devices for viewing matter by means of beams of molecules.

In accordance with this invention, a visible image that represents the spatial distribution of neutral molecule emissions from a sample, in which molecules are defined as comprising electrically neutal material particles of low energy, is formed. Molecules are emitted from a sample and passed through a pinhole to strike a plate where they are read out by an electron beam that desorbs and ionizes the molecules. The desorbed ions are focussed by ion lenses to strike a fluorescent screen which can be photographed or observed with the eye. In this way, neutral molecules can be used to study, for example, the diffusion and evaporation of alkali atoms or alkali oxide molecules along grain boundaries in a sample.

The device utilizes the concept of observing matter by means of neutral atoms instead of by particles of essentially electromagnetic origin. The interaction is that of the electric and magnetic multipoles of the incident atoms and the corresponding electric and magnetic field distributions in the sample. Thus one obtains an entirely different view of matter than that which is obtained with either light, electrons, or ions, a view of matter which is appropriate to problems of metallurgy, chemistry, and biology where the forces and interactions are of strength characterized by moderate temperatures in the range of 100°K to 500°K.

It is the object of this invention to determine the spatial variation in evaporation of neutral atoms or molecules from an inhomogeneous sample.

It is a further object of this invention to form a visible image that represents the spatial distribution of neutral molecule emissions from the sample.

Other objects, advantages, and novel features of the invention will become apparent from the following detailed description thereof when considered in conjunction with the accompanying drawing in which like numerals represent like parts throughout and wherein.

Figure 1:
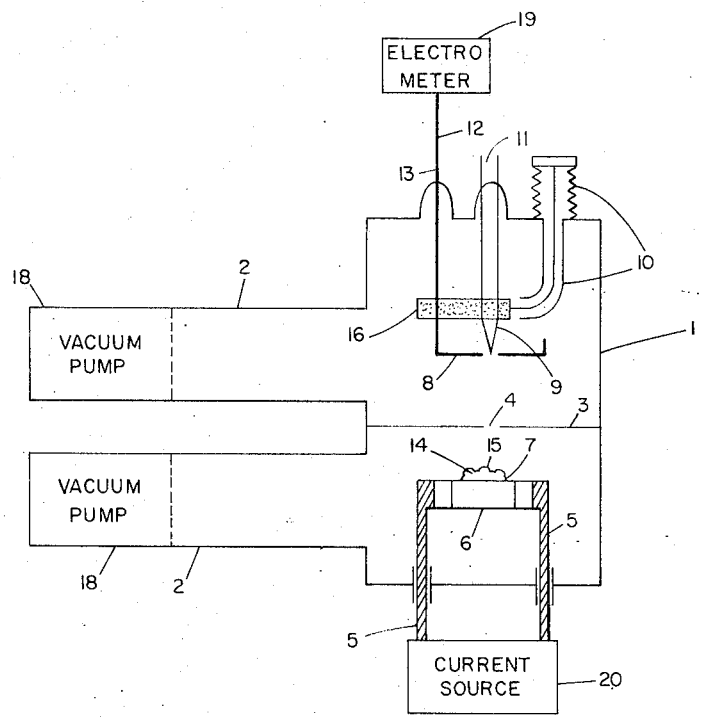
FIG. 1 illustrates one embodiment of the invention.

Referring to FIG. 1, the device consists of a vacuum envelope 1 connected to vacuum pumps 18 by pipes 2. The device is divided into two chambers by a septum 3 equipped with a small aperture 4, the size of a pinhole. The lower chamber, which is the sample chamber, is equipped with water-cooled electrodes 5 which carry heating current from current source 20 into a crucible 6 preferably made of platinum. The sample 7, which consists of a piece of fused potassium feldspar 14 containing quartz grains 15, is placed in the crucible 6 and heated to a temperature sufficient to evaporate molecules from the feldspar 14 but not the quartz 15. 1,200°C was determined to be a suitable temperature for evaporating the atoms or molecules. Molecules evaporating from various parts of the sample 7 pass through the aperture 4 and strike a movable surface ionizing detector consisting of a hot platinum wire 9 having a sharp, V-shaped point, a collector electrode 8 having an opening for passage of the molecules, and an insulator 16, preferably made of boron nitride, rigidly connected between the wire 9 and electrode 8. A description of the surface ionizing detector is given in *Advances in Electronics and Electron Physics* (Vol. VIII, page 42, 1956), by John G. King and Jerrold R. Zacharias. The platinum wire 9 is heated by a current passing through the leads 11. Molecules striking the point of the wire 9 are ionized and collected by the electrode 8 as an ion current 17 proportional to the number of neutral atoms per second striking the wire 9. The ion current 17 is monitored by means of lead 12 insulated by an insulator 13. Varying the pressure produces expansion or contraction of the bellows 10, which is connected to the insulator 16 to impart to the detector motion in parallel with the septum 3, thereby causing the detector to traverse across the septum. The resultant ion current 17 shown in FIG. 2(a), suitably amplified by an electrometer 19, is recorded, representing a single line scan of the sample 7. By also scanning in a direction transverse to the septum 3, an image of the evaporating sample could be mapped. Increased magnification of the device can be obtained by increasing the ratio of the distance between the aperture 4 and the electrode 8 to the distance between the aperture 4 and the sample 7. Magnifications of 100 should be readily available by such techniques.

Figure 2:
FIG. 2(a) shows the detector current as the detector is traversed across the sample.
FIG. 2(b) shows representative molecular beam trajectories and a sectional view of the sample along line A—A in FIG. 2(c)
FIG. 2(c) is a top view of the sample.
Figure 2:
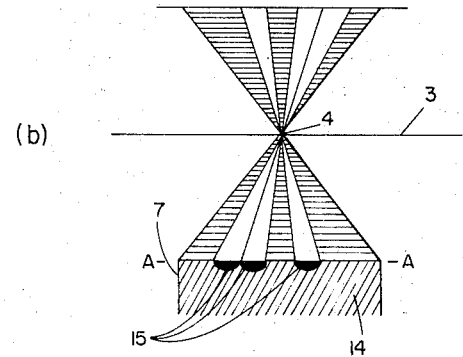

FIGS. 2(a), 2(b), and 2(c) should be viewed together. FIG. 2(c) shows the general appearance of the sample 7, and, in particular, three quartz grains 15 which the detector will scan. FIG. 2(b) shows representative molecular beam trajectories. Note that as the detector traverses across the sample 7 the quartz grains 15 block out the beams with a resultant absence of ion current 17 as shown in FIG. 2(a); in like manner, the molecular beams resulting from evaporation of the feldspar 14 pass through the aperture 4 and are represented by the corresponding ion current as shown in FIG. 2(a). FIG. 2(a), therefore, represents the spatial variation in evaporation from the inhomogeneous sample 7 as observed by means of the neutral molecules.

Alternatively, it would be possible to study grain boundary diffusion in metals by using sharp-point, field ionizing detectors capable of ionizing all atoms in lieu of surface ionizing detectors and mass spectrometers to determine what species of atom are involved.

In accordance with one concept of the above embodiment, besides observing molecules from desorbing or outgassing surfaces, one could bombard the surface with charged particles and examine the ejected neutral molecules or expose the surface to beams of neutral molecules, possibly selected according to electric or magnetic sub-states and possible velocity selected, and examine the scattered beams. Various properties of the sample could be studied by varying both its temperature and that of the incident beam.

Figure 3:
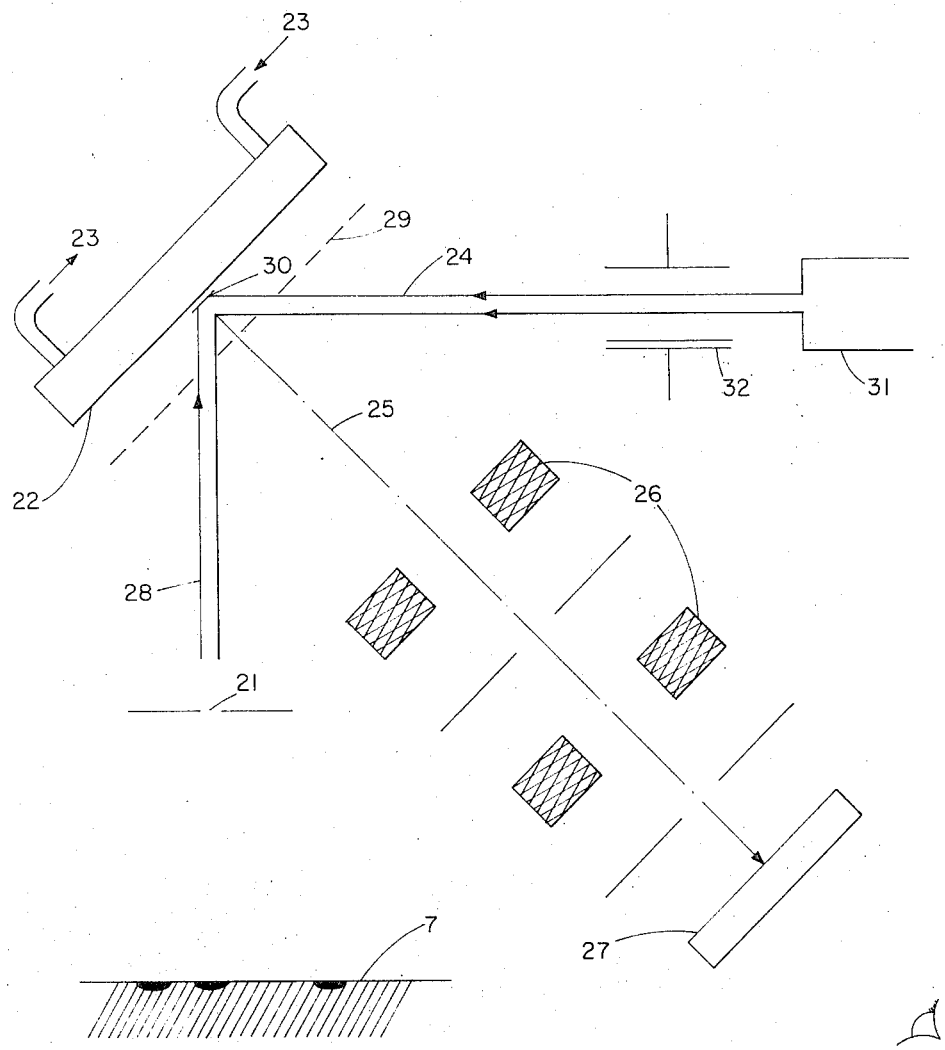
FIG. 3 illustrates an alternative embodiment of the invention.

In another embodiment of the invention shown in FIG. 3 in which the sample 7 in high vacuum emits a beam 28 of neutral molecules, the molecules moving in the appropriate direction are allowed to pass through a pinhole 21 to strike a plate 22 maintained at low temperatures by means of a coolant 23, so that the molecules deposit on the plate 22 having a grid 29 in a distribution which forms an image of the emitter sample 7. The molecules in the image 30 are read out by means of a narrow scanning electron beam 24 generated by an electron gun 31 having deflection plates 32 that simultaneously desorbs and ionizes the molecules. The desorbed ions 25 are then magnified and focussed by ion lenses 26 so as to strike a fluorescent screen 27 which can be photographed or observed with the eye. Thus, a visible image representing the spatial distribution of neutral molecule emission from the sample 7 is formed.

Obviously, many modifications and variations of the present invention are possible in the light of the above teachings. It is, therefore, to be understood that within the scope of the appended claims the invention may be practiced other than as specifically described.

What is claimed is:

1. Apparatus for forming a visible image representing the spatial distribution of neutral molecular emission from a sample comprising:
   a. means for maintaining the sample in a vacuum:
   b. means for emitting only low energy neutral surface molecules from specific locations among all the molecules of the sample surface;
   c. means for selecting these emitted molecules to provide a magnified molecular spatial distribution representing the locations of each molecular emission from the sample;
   d. means for detecting the spatially distributed molecules from a limited region of the sample to provide a spatial distribution of ions of these molecules; and
   e. means for selectively changing the limited region of the sample which is detected.

2. Apparatus as recited in claim 1, wherein the means for emitting neutral molecules from the sample comprises:
   a. a crucible which holds the sample; and
   b. water-cooled electrodes capable of carrying heating current connected to the crucible to heat the sample to a temperature sufficient to evaporate only some of the molecules from the sample.

3. Apparatus as recited in claim 1, wherein the selecting means comprises a septum having a first aperture the size of a pinhole located between the sample and the detecting means to allow emitted molecules to pass through the aperture.

4. Apparatus as recited in claim 3, wherein the detecting means comprises a surface ionizing detector.

5. Apparatus as recited in claim 4, wherein the surface ionizing detector comprises;
   a. a wire having a sharp, V-shaped point heated to an electron current so as to ionize molecules striking the point;
   b. a collector electrode having a second aperture located between the septum and the wire, the collector electrode allowing molecules that pass through the first aperture and the second aperture to strike the point, resulting in an ion current flowing in the collector electrode which is proportional to the number of neutral molecules per second striking the point; and
   c. means for moving the collector electrode and wire in fixed relation to one another and in parallel with the septum so that the detector scans the molecules that pass through the first aperture, said last named means serving as said means for selectively changing the limited region of the sample which is detected.

6. Apparatus as recited in claim 5, wherein the moving means comprises:
   a. a bellows;
   b. an insulator rigidly connected between the collector electrode and wire; and
   c. a control wire connected between the bellows and the insulator causing the wire and electrode to move in fixed relation to one another and in parallel with the septum when the bellows is expanded or contracted by a varying pressure.

7. Apparatus as recited in claim 5, including an electrometer connected to the electrode to amplify the ion current thereby providing a recording that represents the spatial distribution of molecular emission from the sample.

8. Apparatus as recited in claim 1, wherein the detecting means and the means for selectively changing the limited region of the sample which is detected include:
   a. a plate located along the path of the selected molecules so that molecules deposit on the plate;
   b. a coolant in thermal contact with the plate to maintain the plate at a temperature sufficient to cause the molecules to remain where deposited; and
   c. an electron gun having deflection plates so as to direct a scanning electron beam on the deposited molecules causing the molecules to desorb and ionize.

9. Apparatus as recited in claim 8 including:
   a. a fluorescent screen; and
   b. ion lenses located between said plate and the fluorescent screen so as to focus the ions on the screen thereby forming a visible image of the selected molecules.

10. A method for forming a visible image representing the spatial distribution of neutral molecular emission from a sample comprising:
    a. producing a vacuum in a chamber containing said sample;
    b. heating said sample to cause emission of low energy molecules from specific regions only of the sample surface;
    c. selecting those emitted molecules which originate over only a small region of the surface;
    d. with a detecting means detecting these selected emitted molecules;
    e. selecting different regions of the surface and detecting molecules emitted from these different regions;
    whereby a magnified representation of the molecular distribution on the surface is obtained.

11. The method of claim 10 wherein said selecting of molecules from different regions of the surface is accomplished by causing relative movement between the detecting means and the sample.

12. The method of claim 10 wherein said selecting of molecules from different regions of the surface is accomplished by causing relative movement between the detecting means and a pin hole means, said pin hole means performing the function of selection of molecules which originate over only a small region of the surface.

13. A device for analyzing an inhomogeneous sample, capable of producing information concerning constituents at the surface of the sample in cases where the forces and interactions are of strength characterized by temperatures in the range of 100°K to 500°K, said device comprising the combination of means for causing neutral molecules to be emitted from a sample, means defining a pinhole positioned to transmit a beam of said neutral molecules as they proceed from the sample, and an electrical detector having a narrow effective area relative to the beam of particles at the region of detection, a scanning drive for effectively producing relative scanning motion between said sample, pinhole, and detector thereby to progressively ionize said molecules and produce an electrical signal representing the spatial distribution of neutral molecules from the sample.

14. The device of claim 13 including a plate aligned with said beam to produce a deposit of molecules from said pinhole thereupon and means to produce said scanning motion of said detector relative to said plate.

15. The device of claim 14 wherein said detector comprises an ionizing beam device directed to scan said plate and an ion detector for ions desorbed from said plate.

16. The device of claim 13 wherein said electrical detector is aligned to receive said molecules directly from said pinhole.

17. A method for analyzing an inhomogeneous sample, capable of producing information concerning constituents at the surface of the sample in cases where the forces and interactions are of strength characterized by temperatures in the range of 100°K to 500°K, said method comprising the steps of causing neutral molecules to be emitted from a sample, providing a pinhole positioned to transmit a beam of said neutral molecules as they proceed from the sample, providing an electrical detector having a narrow effective area relative to the beam of particles at the region of detection, and effectively producing relative scanning motion between said sample, pinhole and detector thereby to progressively ionize said molecules and produce an electrical signal representing the spatial distribution of neutral molecules from the sample.

18. The method of claim 17 including maintaining said sample under temperature and pressure conditions at which certain molecules at said surface evaporate and certain different molecules at said surface do not, said method producing information about said first mentioned molecules.

19. Apparatus for analyzing an inhomogeneous sample, capable of producing information concerning constituents at the surface of the sample in cases where the forces and interactions are of strength characterized by temperatures in the range of 100°K to 500°K comprising means to release surface molecules bound with energy up to a certain level and not to release surface molecules bound with a certain higher level, and an electrical detector adapted to respond effectively to said released molecules, the apparatus including a scanning system whereby, effectively, said molecules are detected from point to point thereby to progressively produce an electrical representation of the spatial distribution of said certain surface molecules of the sample.

* * * * *